(12) United States Patent
Yabe et al.

(10) Patent No.: US 7,313,385 B2
(45) Date of Patent: Dec. 25, 2007

(54) E-MAIL DISTRIBUTION CONTROL METHOD AND MAIL SERVER

(75) Inventors: Toshiyasu Yabe, Chiba (JP); Masaki Kawabata, Saitama (JP); Shoji Kashiwaba, Yokohama (JP); Taichi Yoshida, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 604 days.

(21) Appl. No.: 10/182,608

(22) PCT Filed: Dec. 3, 2001

(86) PCT No.: PCT/JP01/10535

§ 371 (c)(1),
(2), (4) Date: Dec. 6, 2002

(87) PCT Pub. No.: WO02/47338

PCT Pub. Date: Jun. 13, 2002

(65) Prior Publication Data

US 2003/0134621 A1 Jul. 17, 2003

(51) Int. Cl.
H04M 1/663 (2006.01)
(52) U.S. Cl. .............. 455/412; 709/206; 709/207; 455/412.1; 455/413; 455/412.2
(58) Field of Classification Search ........... 455/412.1, 455/412.2, 413, 466; 709/206, 207
See application file for complete search history.

(56) References Cited

U.S. PATENT DOCUMENTS

| | | | | |
|---|---|---|---|---|
| 5,742,668 A | * | 4/1998 | Pepe et al. | ............ 455/415 |
| 5,940,756 A | | 8/1999 | Sibecas et al. | |
| 5,943,399 A | * | 8/1999 | Bannister et al. | ........ 379/88.17 |
| 6,032,039 A | * | 2/2000 | Kaplan | ............ 455/413 |
| 6,363,412 B1 | | 3/2002 | Niwa et al. | |
| 6,366,792 B1 | | 4/2002 | Katsuki | |
| 6,854,007 B1 | * | 2/2005 | Hammond | ............ 709/206 |
| 6,993,326 B2 | * | 1/2006 | Link et al. | ............ 455/414.1 |
| 2001/0005859 A1 | | 6/2001 | Okuyama et al. | |
| 2002/0143995 A1 | * | 10/2002 | Yeh | ............ 709/246 |

FOREIGN PATENT DOCUMENTS

CN  344180  11/1998

(Continued)

OTHER PUBLICATIONS

Canadian Office Action dated Mar. 16, 2006.

*Primary Examiner*—Saleh Najjar
*Assistant Examiner*—Thuong (Tina) T Nguyen
(74) *Attorney, Agent, or Firm*—Brinks Hofer Gilson & Lione

(57) ABSTRACT

When gateway server 30 receives an email, which is addressed to mobile station 10, gateway server 30 transmits an email arrival notice to mobile station 10. When gateway server 30 receives an acknowledgement response (referred to as 'Ack' hereinafter) responding to the email arrival notice from mobile packet communication network 20, gateway server 30 evaluates the status of mobile station 10 on the basis of the type of Ack, and determines whether to transmit the email or not. Moreover, gateway server 30 modifies the time interval for retransmitting the email arrival notice to mobile station 10 according to the status of mobile station 10 when the transmission of the email arrival notice fails.

22 Claims, 7 Drawing Sheets

FOREIGN PATENT DOCUMENTS

| | | |
|---|---|---|
| CN | 400489 | 8/2000 |
| GB | 2301732 A | 12/1996 |
| JP | S64-078555 A | 3/1989 |
| JP | H4-326225 | 11/1992 |
| JP | H6-282502 | 10/1994 |
| JP | H11-088342 A | 3/1999 |
| JP | H11-154121 A | 6/1999 |
| JP | H11-163920 A | 6/1999 |
| JP | H11-252103 | 9/1999 |
| JP | H11-313083 A | 11/1999 |
| JP | H11-331234 A | 11/1999 |
| JP | 2000-151639 A | 5/2000 |
| WO | WO 98/44640 | 10/1998 |
| WO | WO 99/12364 | 3/1999 |
| WO | WO 00/08813 | 2/2000 |

\* cited by examiner

FIG. 4

| EMAIL ADDRESS | MOBILE STATION ID | NAME OF EMAIL | TIMING INFORMATION | COUNTER |
|---|---|---|---|---|
| ADDRESS A | MOBILE STATION A | EMAIL X | ×HOURS××MINUTES××SECONDS | 3 |
| | | EMAIL Y | | |
| ADDRESS B | MOBILE STATION B | EMAIL W | □HOURS□□MINUTES□□SECONDS | 0 |
| ADDRESS C | MOBILE STATION C | EMAIL Z | △HOURS△△MINUTES△△SECONDS | 1 |
| ... | ... | ... | ... | ... |

E-MAIL DISTRIBUTION CONTROL METHOD AND MAIL SERVER

This application is a 371 of PCT/JP01/10535 filed on Dec. 3, 2001

TECHNICAL FIELD

The present invention relates to a method of controlling email delivery and an email server for retransmitting emails to mobile stations, such as mobile phones, in a mobile communication network.

BACKGROUND ART

In recent years, several kinds of mobile communication systems providing email services to users of mobile stations, such as mobile phones, which are connected to the Internet through various mobile communication networks, have come into use. In the mobile communication systems, emails addressed to subscribers of mobile stations are at first received by email servers, who in turn deliver the emails to the subscribers of mobile stations.

Generally speaking, in a mobile communication network, the communication status of a mobile station is unstable, and can cause communication failures. Therefore, when emails are delivered during a communication failure, a mobile station is unable to carryout the routine function of receiving the emails, which would produce an increase of communication traffic from the large number of undelivered mail leading to a traffic congestion, especially on narrowband networks such as mobile packet communication networks.

DISCLOSURE OF THE INVENTION

The present invention has been made in the light of the foregoing description of the prior art, and it is an object of the present invention to provide a method of controlling email delivery and an email server, which can deliver emails through a mobile communication network by maintaining a smooth flow of email traffic even when there is an increase in the number of deliveries; and, can prevent traffic congestion of email deliveries while retransmitting emails, whose earlier attempts at delivering to mobile stations failed.

To solve the above-mentioned problem of the prior art, the present invention proposes a method of controlling email delivery, which comprises: a receiving step for receiving an email, which is addressed to a mobile station; a status obtaining step for obtaining information on communication status of the mobile station from a mobile communication network to which the mobile station belongs; a transmission determining step for determining whether the email should be transmitted to the mobile station at the present moment or not, on the basis of the information on the communication status; a transmitting step for transmitting the email if the email is determined to be transmitted in the transmission determining step, and; a retrial instructing step for setting a waiting time on the basis of the information on the communication status, and instructing the execution of obtaining operation by the status obtaining step following the waiting time, if the email is determined to not be transmitted in the transmission determining step, or if the email is determined to be transmitted in the transmission determining step and transmission of the email fails. This is the first mode of the proposed method of controlling email delivery of the present invention.

Another preferred mode of the method of controlling email delivery of the present invention comprises all characteristics of the first mode of the method of controlling email delivery; and further comprises an arrival notice transmitting step for transmitting a notice of arrival of the email to the mobile station, when the email, which is addressed to the mobile station, is received, and; information on communication status with regard to reception of the notice of arrival is obtained as the information of communication status in the status obtaining step. This is the second mode of the proposed method of controlling email delivery of the present invention.

Another preferred mode of the method of controlling email delivery of the present invention comprises all characteristics of the first mode of the method of controlling email delivery; and the information on the communication status, which is obtained in the status obtaining step, indicates any of the following: communication possible status, communication busy status, or communication impossible status; in the retrial instructing step, a first time period is set as the waiting time if the information on the communication status indicates communication busy status, and a second time period, which is longer than the first time period, is set as the waiting time if the information on the communication status indicates communication impossible status. This is the third mode of the proposed method of controlling email delivery of the present invention.

Another preferred mode of the method of controlling email delivery of the present invention comprises all characteristics of the first mode of the method of controlling email delivery; and the waiting time is determined on the basis of number of times of execution of the status obtaining step for the email up to the present moment. This is the fourth mode of the proposed method of controlling email delivery of the present invention.

Another preferred mode of the method of controlling email delivery of the present invention comprises all characteristics of the fourth mode of the method of controlling email delivery; and in the retrial instructing step, if the number of times of execution of the status obtaining step for the email up to the present moment is the same as or more than a predetermined number, a predetermined time period is set as the waiting time. This is the fifth mode of the proposed method of controlling email delivery of the present invention.

Another preferred mode of the method of controlling email delivery of the present invention comprises all characteristics of the first mode of the method of controlling email delivery, and the information on the communication status is information of strength of received radio wave of the mobile station. This is the sixth mode of the proposed method of controlling email delivery of the present invention.

Another preferred mode of the method of controlling email delivery of the present invention comprises all characteristics of the first mode of the method of controlling email delivery, and the information on the communication status is information of transition of strength of received radio wave of the mobile station. This is the seventh mode of the proposed method of controlling email delivery of the present invention.

Moreover, an email server of the present invention comprises: a receiving means for receiving an email, which is addressed to a mobile station; a status obtaining means for obtaining information on communication status of the mobile station from a mobile communication network, to which the mobile station belongs; a transmission determining means for determining whether the email should be transmitted to the mobile station at the present moment or not on the basis of the information on the communication status; a transmitting means for transmitting the email if the email is determined to be transmitted by the transmission determining means, and; a retrial instructing means for setting a waiting time on the basis of the information on the communication status, and instructing the operation of the status obtaining means following the waiting time, if the email is determined not to be transmitted by the transmission determining means.

BRIEF DESCRIPTION OF THE DRAWINGS

FIG. 4 is a format chart showing a mailbox administration table, which is stored in a memory of an email delivery-managing unit, according to the first embodiment of the present invention.

BEST MODE FOR CARRYING OUT THE INVENTION

In the following paragraphs, an embodiment of the present invention is explained with reference to drawings. The embodiment explained below, is a system where the present invention is applied to a mobile communication system, which is connected to the Internet.

[1] Embodiment

[1.1] Configuration of Embodiment (1) Configuration of System

Figure 1:
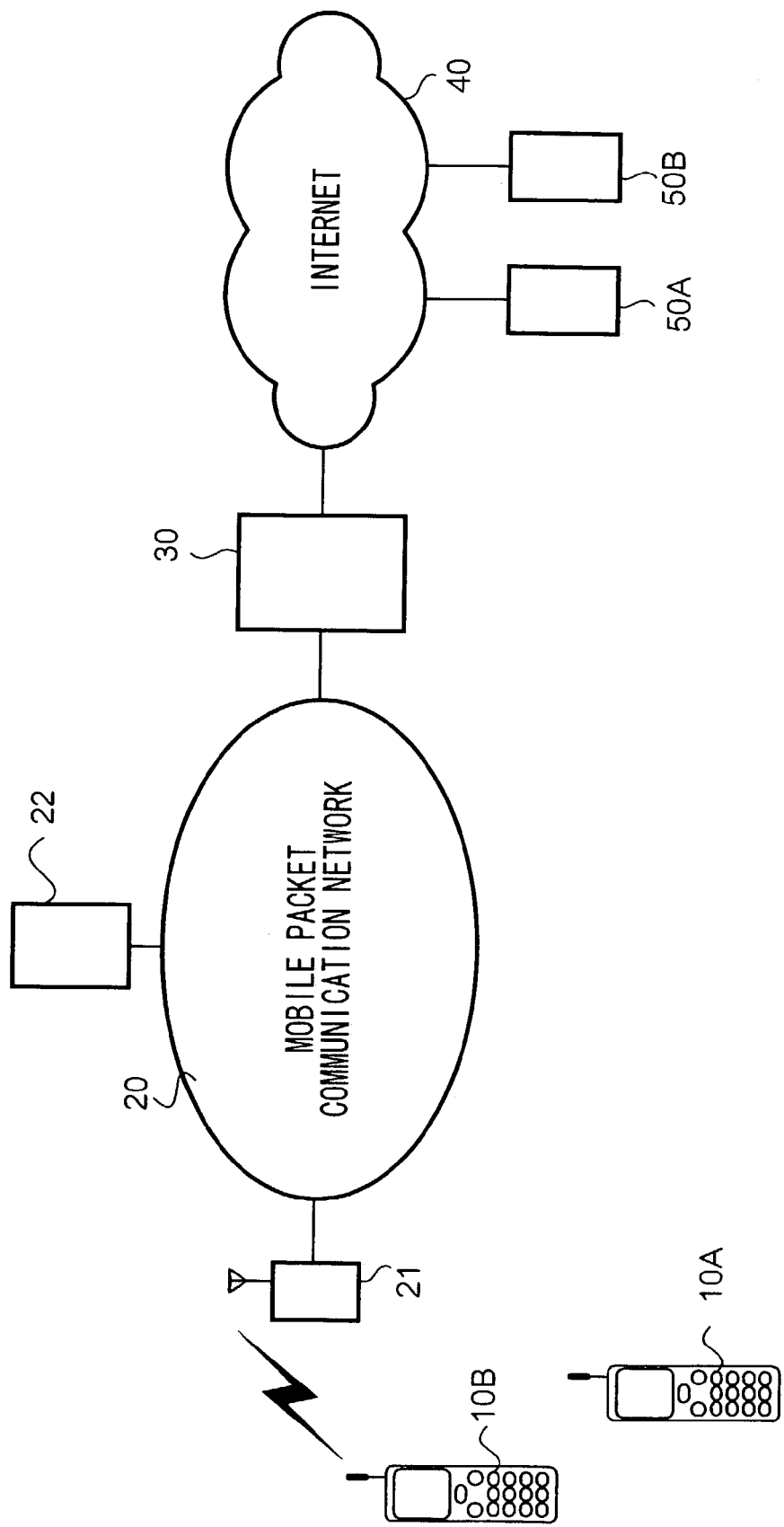
FIG. 1 is a block diagram showing a configuration of a mobile communication system according to the first embodiment of the present invention.

FIG. 1 is a diagram showing a configuration of a mobile communication system in this embodiment. The mobile communication system in this embodiment contains a plurality of mobile stations 10A, 10B . . . , mobile packet communication network 20, base station 21, service control station 22, gateway server 30, Internet 40, and a plurality of terminals 50A, 50B . . . , etc. In FIG. 1, only mobile stations 10A and 10B, and terminals 50A and 50B, are shown representing a plurality of mobile stations 10A, 10B . . . in the mobile communication network, and a plurality of terminals 50A, 50B . . . in the mobile communication network, respectively, to simplify the diagram.

Terminals 50A, 50B . . . (referred to as 'terminals 50' hereinafter, if there is no need to distinguish them from each other), are terminals, such as personal computers, which are connected to Internet 40. Terminal 50 has a keyboard (not shown) and a computer mouse (not shown) by which its user inputs data; a display unit (not shown) for displaying text messages and images; as well as, several components for data communication with other communication devices through Internet 40.

Moreover, a program for composing, transmitting, and receiving emails is installed in terminal 50, and terminal 50 functions as an email client. In this description, 'an email client' means an apparatus, which transmits and receives emails using given email addresses. Terminal 50 composes emails following particular operations carried out by its user, and executes email-transmitting processes of the emails, according to the installed program. On the other hand, terminal 50 obtains information on emails addressed to terminal 50, which exist in Internet 40, automatically or following the operations carried out by its user, and displays the information in the above-mentioned display unit.

Mobile stations 10A, 10B . . . (referred to as 'mobile stations 10' hereinafter, if there is no need to distinguish them from each other), are mobile communication terminals, such as mobile phones and Personal Handy-phone Systems (PHSs; registered trademark), which can use a communication service in mobile packet communication network 20, and execute data communication and voice communication through mobile packet communication network 20. Each of mobile stations 10 has an email address for transmitting and receiving emails and it can function as an email client.

Mobile packet communication network 20 is a communication network, which provides packet communication service for mobile stations 10. Mobile packet communication network 20 has gateway server 30, a plurality of base stations 21, and service control station 22, as well as, a packet subscriber management apparatus (not shown). Base station 21 executes data communication with mobile station 10 through a radio communication device (not shown). Service control station 22 has a position registration table. In the position registration table, data of locations of mobile stations 10, namely data of service areas where mobile stations 10 are located, are stored with IDs of mobile stations 10 corresponding to the data of the service areas. In this description, an ID of mobile station 10 means an identifier, which provides exclusive identity to each mobile station 10 in mobile packet communication network 20. Contents of the position registration table are updated by a position registration operation, which is executed by mobile station 10, and the position registration operation is the same as the one in a conventional system. Hence, an explanation of the operation is omitted in this description.

The position registration table is referred to obtain a location of mobile station 10 and call mobile station 10 when there is an email arrival for mobile station 10. To be more specific, when mobile packet communication network 20 receives an email addressed to mobile station 10, mobile packet communication network 20 identifies the service area where mobile station 10 is located on the basis of the position registration table of service control station 22. Then, mobile packet communication network 20 transmits to mobile stations 10, an email arrival notice from all base stations 21 in the service area. When mobile station 10 receives the email arrival notice, it transmits an acknowledgement response with regard to the email arrival notice. In this embodiment, there are two kinds of acknowledgement responses, which mobile station 10 transmits in response to email arrival notices, as described below:

a. Normal acknowledgement response (referred to as 'normal Ack' hereinafter)

This response is an acknowledgement response, which indicates that mobile station 10 is now available.

b. Busy acknowledgement response (referred to as 'busy Ack' hereinafter)

This response is an acknowledgement response, which indicates that the communication line of mobile station 10 is now busy.

In the instance that no acknowledgement response is transmitted from mobile station 10 within a predetermined time period after an email arrival notice is transmitted to mobile station 10, mobile packet communication network 20 transmits a negative acknowledgement response (referred to as 'NAck' hereinafter) to the node of the transmitting side, which indicates that mobile station 10 is not available now. On the other hand, in the instance that an acknowledgement response to an email arrival notice is transmitted from mobile station 10 within a predetermined time period after the email arrival notice is transmitted to mobile station 10, mobile packet communication network 20 forwards the acknowledgement response to the node of the transmitting side. In the following explanation, 'Ack' is used as a general term for normal Ack, busy Ack, and NAck, when there is no need to distinguish them from each other. This is a summary of the calling operation carried out by a mobile station using the position registration table.

Gateway server 30 is a computer system provided to a packet gateway switching and relaying station, which interconnects Internet 40 and mobile packet communication network 20. Gateway server 30 functions as an email server, which relays email communication between email clients (namely, mobile stations 10 and terminals 50). To be more specific, gateway server 30 receives emails, which should be transmitted from terminals 50 in the side of Internet 40 or mobile stations 10 in the side of mobile packet communication network 20 to other mobile stations 10. Then, gateway server 30 transmits email arrival notices and the received emails to mobile stations 10 to which the emails are addressed.

If gateway server 30 transmits an email to mobile station 10 and mobile station 10 receives the email successfully, mobile station 10 transmits a reception success notice to gateway server 30 through base station 21. On the other hand, if mobile station 10 fails to receive the email, mobile station 10 does not transmit a reception success notice. In such a case, base station 21 confirms that no reception success notice was transmitted in a predetermined time period, and transmits a reception failure notice to gateway server 30.

Gateway server 30 receives reception success notices, reception failure notices, and Ack as mentioned above, and judges whether the email arrival notice needs to be retransmitted on the basis of the information given by these notices. At the same time, gateway server 30 evaluates the communication status of mobile station 10 on the basis of the information, and sets the proper retransmission times of the email arrival notices. The time setting operation is precisely explained in the latter part of the following description.

(2) Configuration of Mobile Station 10

Figure 2:
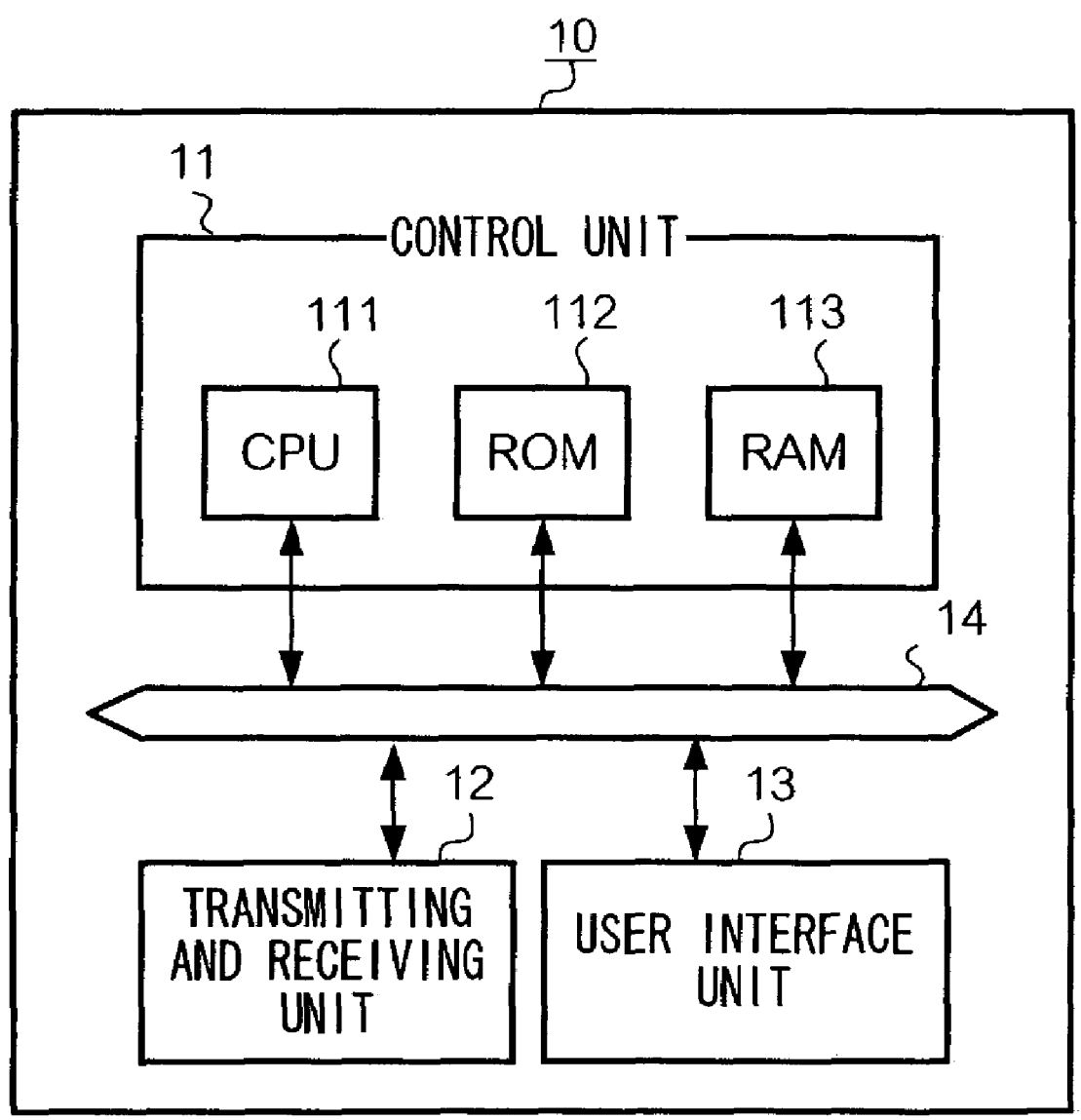
FIG. 2 is a block diagram showing a configuration of a mobile station according to the first embodiment of the present invention.

FIG. 2 is a block diagram showing a configuration of mobile station 10 in this embodiment. Mobile station 10 has control unit 11; transmitting and receiving unit 12; user interface unit 13 (referred to as 'user I/F unit 13' hereinafter); and bus 14, which interconnects these units.

Transmitting and receiving unit 12 executes radio communication between mobile packet communication network 20 and base station 21. User I/F unit 13 has a liquid crystal display unit (not shown), for displaying dialog screens and various kinds of information; a key pad (not shown) by which the user inputs various kinds of data; a microphone (not shown); and a speaker (not shown) by which the user talks with other people, etc.

Control unit 11 comprises CPU 111, ROM 112, and RAM 113, and it controls each component of mobile station 10. ROM 112 stores mobile station IDs for identifying each mobile station 10 in mobile packet communication network 20; control programs and various kinds of control information for controlling the whole of mobile station 10; a program for establishing communication connection between gateway server 30 and mobile station 10; and a program for composing, transmitting, and receiving emails. RAM 113 is used as the work area of CPU 111; and CPU 111 executes various kinds of processes by reading out control programs from ROM 112 to ROM 113 and following the programs. If mobile station 10 receives an email, CPU 111 writes the email in RAM 113. And when the user instructs mobile station 10 to display the email using the key pad (not shown), etc. of I/F unit 13, for example, CPU 111 displays the message of the email in the liquid crystal display unit (not shown) of I/F unit 13.

(3) Configuration of Gateway Server 30

Figure 3:
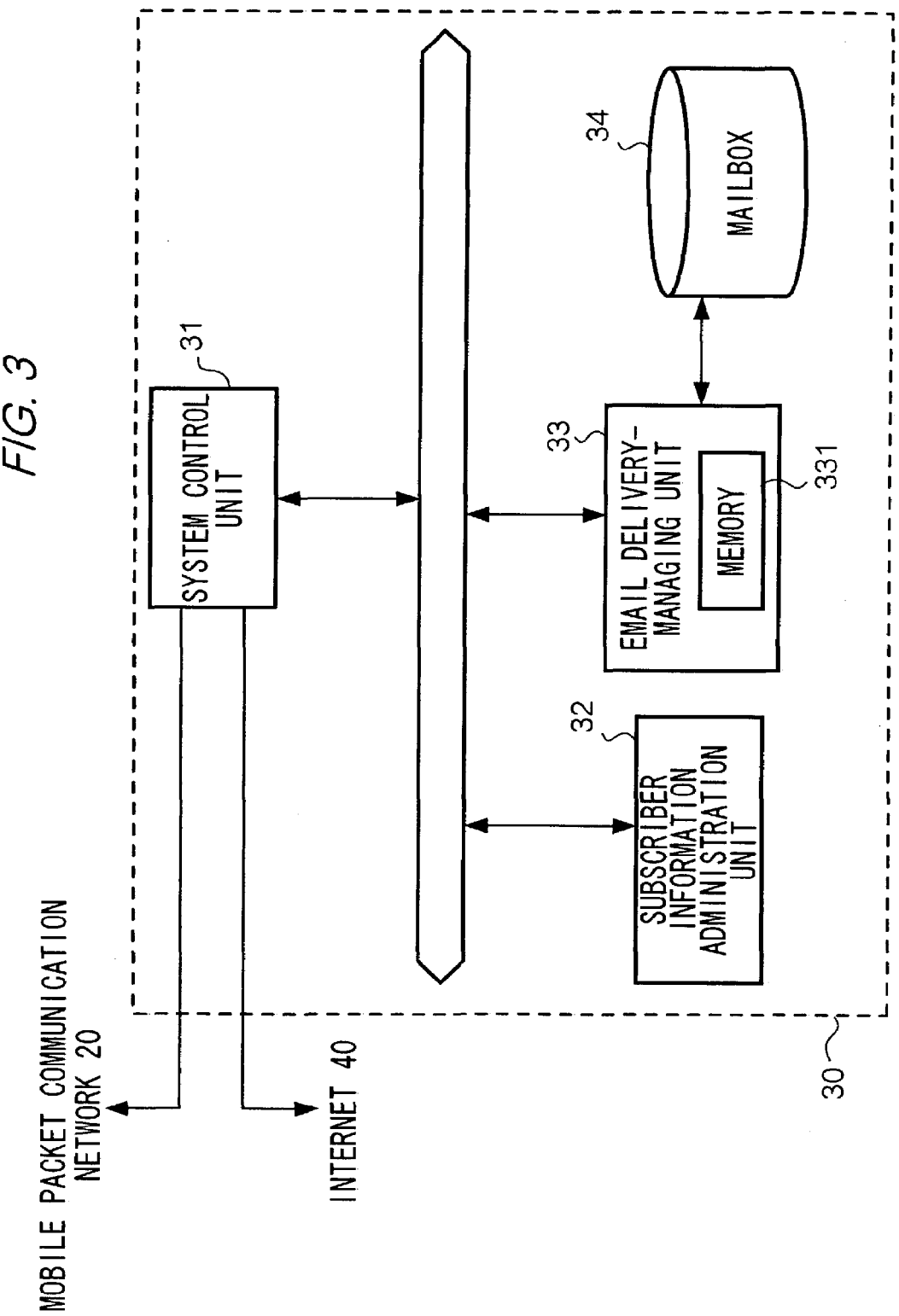
FIG. 3 is a block diagram showing a configuration of a gateway server according to the first embodiment of the present invention.

FIG. 3 is a diagram showing a configuration of gateway server 30 in this embodiment. Gateway server 30 has system control unit 31, subscriber information administration unit 32, email delivery-managing unit 33, and mailbox 34.

System control unit 31 controls each component of gateway server 30. At the same time, system control unit 31 functions as an interface between different communication networks, and executes protocol conversions between mobile packet communication network 20 and other communication networks such as Internet 40. For example, if system control unit 31 receives data addressed to terminal 50 from mobile station 10, control unit 31 converts the format of the data from the protocol used in mobile packet communication network 20 into the protocol used in Internet 40, and transmits the data to Internet 40.

Subscriber information administration unit 32 stores and administrates information concerning subscribers of the packet communication service provided by mobile packet communication network 20. The information contains telephone numbers and email addresses of mobile stations 10A, 10B . . . , attributive information of the subscribers, and so on.

Email delivery-managing unit 33 manages delivery of emails between email clients. To be more specific, email delivery-managing unit 33 receives emails addressed to mobile station 10, and stores them in mailbox 34 temporarily. Then, email delivery-managing unit 33 transmits the stored email to mobile station 10, to which the email is addressed. In mailbox 34, each mobile station 10 is allotted a memory address according to its email address, and email delivery-managing unit 33 stores the email at the memory address which corresponds to the email address of mobile station 10, to which the email is addressed.

As mentioned above, when an email arrival notice needs to be retransmitted to mobile station 10, gateway server 30 sets the retransmission time of email arrival notice according to the communication status of mobile station 10. To execute this operation, email delivery-managing unit 33 has memory 331, in which a mailbox administration table is stored as shown in FIG. 4. The mailbox administration table stores mobile station IDs, names of emails stored in mailbox 34, timing information, and counters, which are arranged according to email addresses. The timing information shows the times when email arrival notices should be retransmitted to each mobile station 10, and email delivery-managing unit 33 retransmits email arrival notices following the timing information. The counters are increased by '1' when email delivery-managing unit 33 does not receive an Ack within a certain time period after an email arrival notice is transmitted, or when email delivery-managing unit 33 receives a NAck.

[1.2] Operation of Embodiment

Following is a description of the operations of the above-mentioned embodiment, whereby; an email is transmitted from terminal 50A in Internet 40 to mobile station 10A in mobile packet communication network 20.

When gateway server 30 receives an email addressed to mobile station 10A from terminal 50A, system control unit 31 forwards the email to email delivery-managing unit 33, and email delivery-managing unit 33 stores the email in mailbox 34. At the time of storing the email, email delivery-managing unit 33 stores the name of the email in the mailbox administration table of memory 331 in correspondence with the email address of mobile station 10A.

Figure 6:
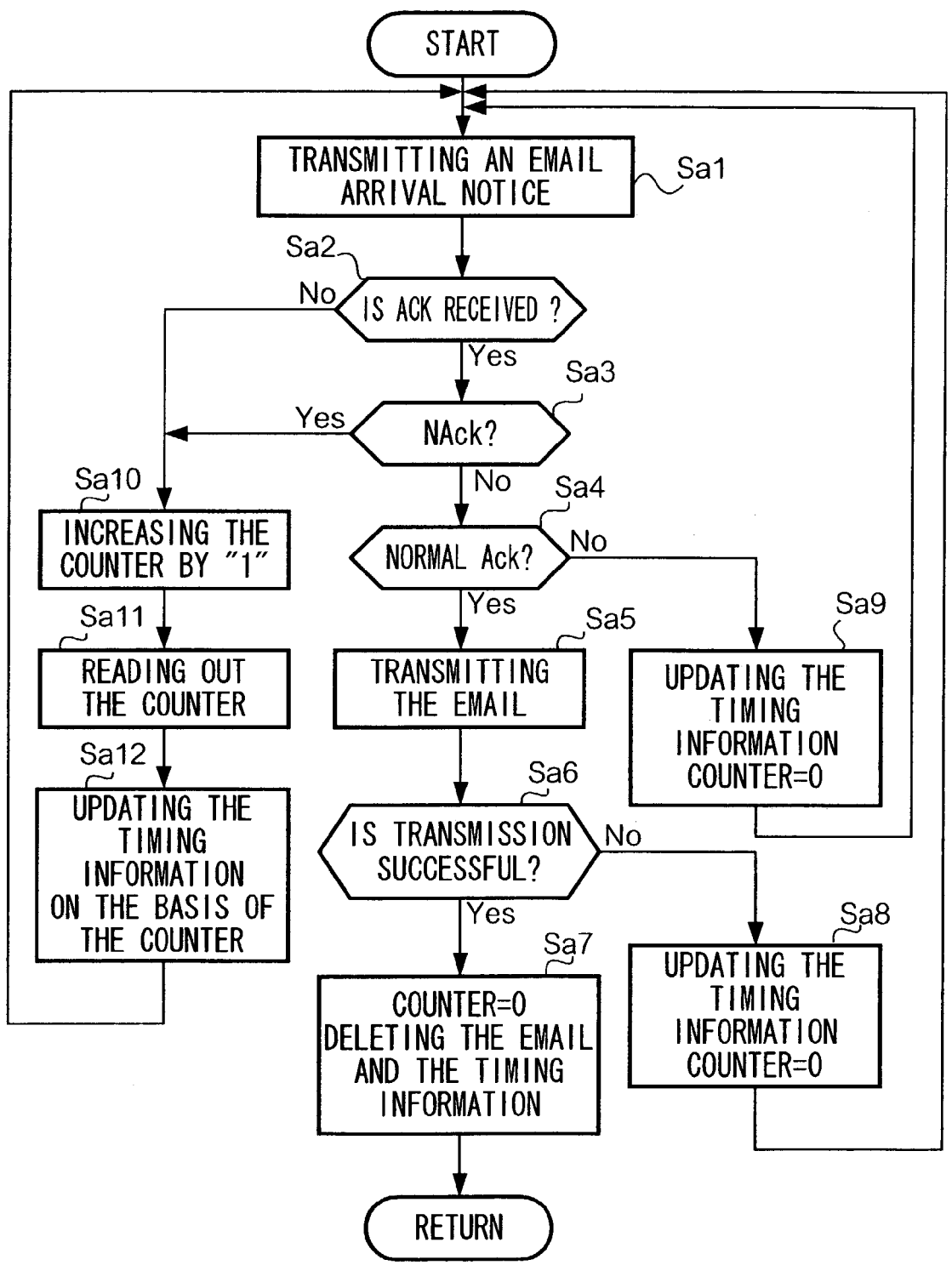
FIG. 6 is a flowchart showing a process, which is executed by an email delivery-managing unit according to the first embodiment of the present invention.

After gateway server 30 stores the received email in mailbox 34 and stores the name of the email in the email administration table, email delivery-managing unit 33 executes an email delivery process, which is shown in FIG. 6.

First, email delivery-managing unit 33 reads out the timing information corresponding to the email in the mailbox administration table, and if the time indicated by the timing information is prior to the current time, email delivery-managing unit 33 transmits an email arrival notice to mobile station 10A, to which the email is addressed, through system control unit 31, according to the information in the mailbox administration table (step Sa1).

Next, email delivery-managing unit 33 monitors, for a certain period of time, the reception of an Ack, which is a response to the email arrival notice, and judges if the Ack is received (step Sa2). Namely, email delivery-managing unit 33 checks if gateway server 30 receives an Ack from mobile packet communication network 20, repeatedly, at short regular intervals, until the Ack is received or until a certain predetermined time period set for checking the receipt of the Ack passes.

(1) In the Instance that no Ack is Received or a NAck is Received

In the instance that gateway server 30 does not receive an Ack within a certain time period, email delivery-managing unit 33 obtains a 'No' as the result of the judgment carried out in step Sa2, and the operation moves to step Sa10.

On the other hand, in the instance that gateway server 30 receives a NAck, email delivery-managing unit 33 obtains a 'Yes' as the result of the judgment of step Sa2. Then, email delivery-managing unit 33 judges whether the received Ack is a NAck in step Sa3, and it obtains a 'Yes' as the result of the process carried out in step Sa3, and the operation moves to step Sa10.

As explained above, if gateway server 30 does not receive an Ack or if gateway server 30 receives a NAck, the operation moves to step Sa10, and email delivery-managing unit 33 increases the counter corresponding to mobile station 10A in the mailbox administration table by '1'.

Next, email delivery-managing unit 33 reads out the updated counter (step Sa11).

Figure 5:
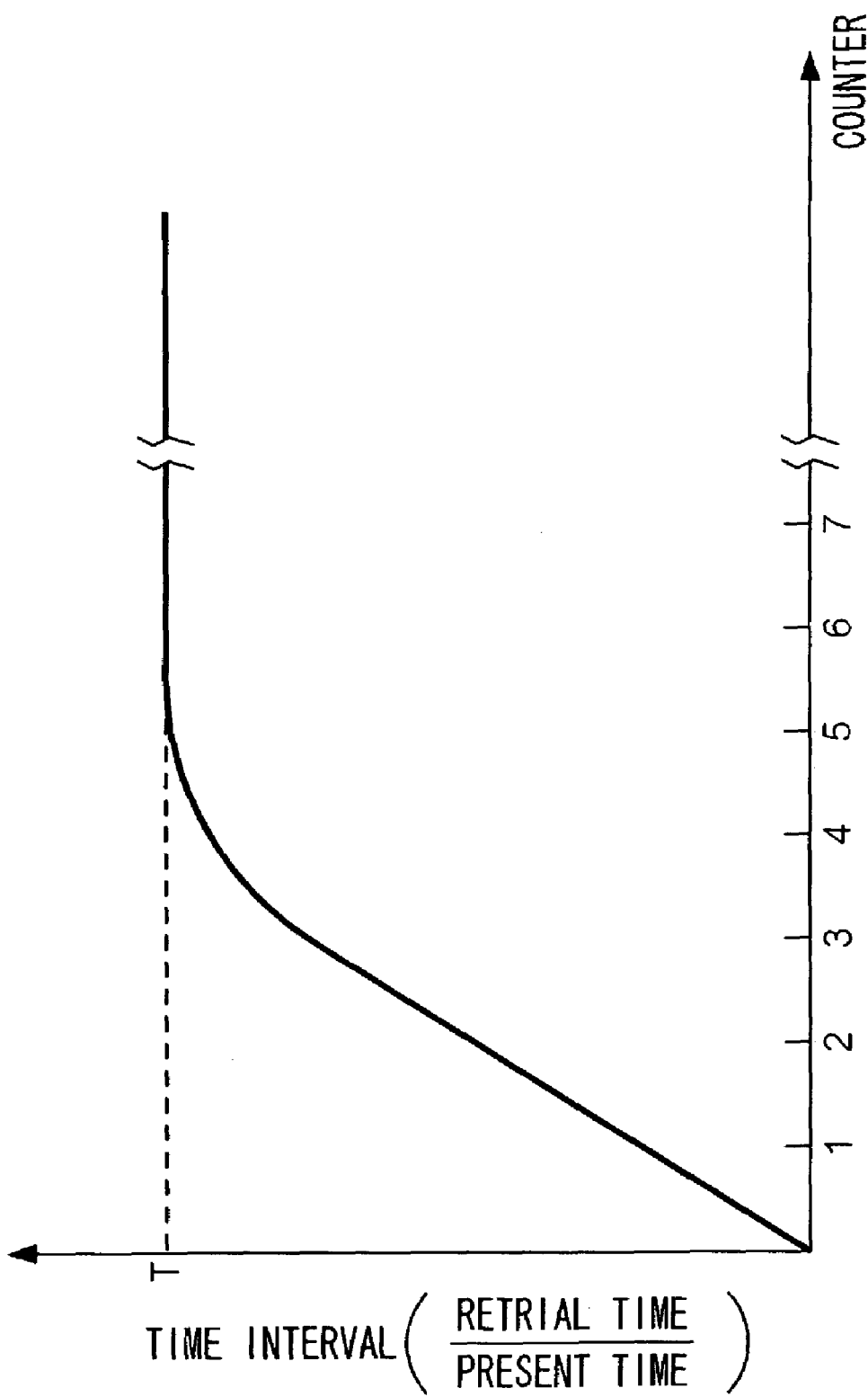
FIG. 5 is a graph showing a relation between values of counters, which an email delivery-managing unit sets, and time intervals for retransmissions of arrival notices.

Then, email delivery-managing unit 33 determines a time interval to be maintained between the current time and the time when an email arrival notice should be retransmitted (referred to as 'retrial time' hereinafter), on the basis of the updated counter. Namely, email delivery-managing unit 33 determines the time interval between the current time and the retrial time, and updates the timing information corresponding to mobile station 10A in the mailbox administration table using the determined time interval (step Sa12). FIG. 5 illustrates a graph showing the relation between the counter, which email delivery-managing unit 33 uses to calculate the time interval, and the time interval for retransmission of the email arrival notice. As shown in the graph, where the counter is smaller than a certain value, email delivery-managing unit 33 calculates a time interval for retransmission of email arrival notice in direct proportion to the size of the counter; and where the counter is larger than a certain determined value, email delivery-managing unit 33 calculates a time interval for retransmission of the email arrival notice so as to be within a predetermined maximum time interval T where all time intervals converge. The maximum time interval T can be set at any value.

After step Sa12, the operation of email delivery-managing unit 33 returns to step Sa1, and proceeds to the above-mentioned operations or the following operations, which are carried out according to the situation.

(2) In the Instance that a Busy Ack is Received

In the instance that gateway server 30 receives a busy Ack, email delivery-managing unit 33 obtains a 'No' as the result of the judgment carried out in step Sa3 for judging whether the received Ack is a NAck or not.

Then, email delivery-managing unit 33 obtains a 'No' as the result of the judgment of step Sa4 for judging whether the received Ack is a normal Ack or not.

Then, email delivery-managing unit 33 updates the timing information corresponding to mobile station 10A in the mailbox administration table using the predetermined time interval, and at the same time, email delivery-managing unit 33 initializes the counter corresponding to mobile station 10A into '0' (step Sa9). According to this operation, the new timing information, namely the retrial time, corresponding to mobile station 10A becomes the time when the predetermined time interval passes after email delivery-managing unit 33 receives an Ack.

After step Sa9, the operation of email delivery-managing unit 33 returns to step Sa1, and proceeds to the above-mentioned operations or the following operations carried out according to the situation.

(3) In the Instance that a Normal Ack is Received

In the instance that gateway server 30 receives a normal Ack, email delivery-managing unit 33 obtains a 'No' as the result of the judgment carried out in step Sa3 for judging whether the received Ack is a NAck or not.

Then, email delivery-managing unit 33 obtains a 'Yes' as the result of the judgment carried out in step Sa4 for judging whether the received Ack is a normal Ack or not.

Then, email delivery-managing unit 33 reads out the name of the email corresponding to mobile station 10A in the mailbox administration table, and reads out the email, which is stored in mailbox 34 using the name of the email. At the same time, email delivery-managing unit 33 reads out the mobile station ID corresponding to mobile station 10A in the mailbox administration table, and transmits the email to mobile station 10A through system control unit 31 using the information of the mobile station ID (step Sa5).

Next, email delivery-managing unit 33 judges whether the email was delivered successfully, namely whether a reception success notice responding to the email is received from mobile station 10A (step Sa6).

(i) In the Instance that Email Delivery Fails

In the instance that gateway server 30 receives a reception failure notice from mobile station 10A through base station 21, gateway server 30 obtains a 'No' as the result of the judgment carried out in step Sa6.

Then, email delivery-managing unit 33 updates the timing information corresponding to mobile station 10A in the mailbox administration table using the predetermined time interval, and at the same time, email delivery-managing unit 33 initializes the counter corresponding to mobile station 10A into '0' (step Sa8). According to this operation, the new timing information, namely the retrial time, corresponding to mobile station 10A becomes the time when the predetermined time interval passes after email delivery-managing unit 33 receives an Ack.

After step Sa8, the operation of email delivery-managing unit 33 returns to step Sa1, and proceeds to the above-mentioned operations or the following operations carried out according to the situation.

(ii) In the Instance that Email Delivery Succeeds

In the instance that gateway server 30 receives a reception success notice from mobile station 10A, or in the instance that gateway server 30 does not receive either a reception success notice or a reception failure notice from mobile station 10A after a certain time period, gateway server 30 obtains a 'Yes' as the result of the judgment carried out in step Sa6.

If gateway server 30 receives a reception success notice from mobile station 10A, email delivery-managing unit 33 deletes the email from mailbox 34 and deletes the name of the email from the mailbox administration table. At the same time, gateway server 30 initializes the counter corresponding to mobile station 10A into '0', and ends the series of operations. On the other hand, if gateway server 30 does not receive either a reception success notice or a reception failure notice from mobile station 10A after a certain time period, email delivery-managing unit 33 only initializes the counter corresponding to mobile station 10A, and ends the series of operations (step Sa7).

[1.3] Setting of Time Interval for Retransmission of Email Arrival Notice

As mentioned above, according to the email delivery control method in this embodiment, gateway server 30 can set time intervals for retransmission of email arrival notice to each mobile station according to an Ack or a reception failure notice, which is transmitted from each mobile station through mobile packet communication network 20.

(1) In the Instance that no Ack is Received or a NAck is Received

In the instance that gateway server 30 does not receive an Ack or gateway server 30 receives a NAck, as mentioned above, it is preferable that such a relation between the counter and the time interval for retransmission of email arrival notice as shown in FIG. 5 should be used for determining the time interval because of the following reasons. When mobile packet communication network 20 transmits a NAck, there are several possible situations as follows: mobile station 10 may be moving from a radio wave zone of a base station to another radio wave zone of another base station, and the radio wave strength of mobile station 10 may have decreased temporarily (under a state of 'decrease of radio wave strength caused by roaming'); mobile station 10 may be located outside the service area; the power supply to mobile station 10 has been shut off or; mobile station 10 has broken down. If mobile station 10 is located outside the service area, there is a strong possibility that mobile station 10 will be able to communicate after a short period of time. However, if mobile station 10 has broken down, there is no possibility of mobile station 10 transmitting an Ack even though email arrival notices are frequently transmitted to mobile station 10. And in such a case, gateway server 30 receives a NAck repeatedly from mobile packet communication network 20.

On the other hand, if mobile packet communication network 20 does not transmit any Ack, it could be due to a problem in the mobile packet communication network. The problem may be just temporary and soon rectified, but in some cases it may take a long time to rectify the problem.

Generally speaking, it can be assumed that the more the number of reception failures of Ack and receptions of Nack, after the last successful communication between gateway server 30 and mobile station 10; namely, the increase in the size of the counter in the mailbox administration table of this embodiment; the stronger the possibility that mobile station 10 will not be able to communicate for a long period of time. Under such circumstances, if email arrival notices are frequently transmitted to mobile station 10, there is a strong possibility that the increased data traffic due to a lot of untransmittable data in mobile packet communication network 20 would cause a traffic congestion.

To avoid such a problem as mentioned above, email delivery-managing unit 33 makes the time interval for retransmission of email arrival notice longer according to how large the counter is, thereby, reducing the increase of data traffic containing a lot of untransmittable data.

However, according to FIG. 5, when the counter is larger than a certain value, the time interval for retransmission of an email arrival notice is set to converge to a predetermined maximum time interval T. The object of this convergence is to meet the demand for quick email transmission, which is generally expected in an email delivery service, even when the counter has become quite large. It can be freely determined, on the basis of statistical data, and past experiences etc., what the maximum limit should be for time interval T.

As a matter of course, the time interval for retransmission of email arrival notice, when gateway server 30 does not receive an Ack or gateway server 30 receives a NAck, can be determined on the basis of other relations than the one illustrated in FIG. 5.

(2) In the Instance that a Busy Ack is Received

When gateway server 30 receives a busy Ack, as mentioned above, gateway server 30 uses a certain predetermined time interval as the time interval for the retransmission of an email arrival notice.

In this instance, mobile station 10 is inside the area where it can communicate, but mobile station 10 cannot return to the state of being able to communicate till the current communication ends. Therefore, it is preferable that the time interval should be determined according to the average time required for ordinal communication.

(3) In the Instance that Email Delivery Fails

In the instance that gateway server 30 receives a reception failure notice from mobile station 10 through mobile packet communication network 20, as mentioned above, gateway server 30 uses a certain predetermined time interval as the time interval for a retransmission of the email arrival notice.

In the instance that mobile station 10 fails to receive an email because it has been in the state of not being able to communicate for a short time, there is a strong possibility that the reason why mobile station 10 failed to receive an email is a temporary one, such as the decrease in the strength of the radio wave received by mobile station 10 because of the presence of surrounding buildings, etc. Due to the temporary nature of the communication status of reception failure, it can be assumed that there is a strong possibility that mobile station 10 will return to the status of being able to communicate after a short time period. Therefore, it is preferable that the time interval for retransmission of email to mobile station 10 be determined to be a short time period.

(4) Comparison Among Time Intervals for Retransmission of Email Arrival Notice

Because of the reasons mentioned above, generally speaking, it is preferable that time intervals to instances (1), (2), and (3) are different from each other in the relations mentioned below.

The time interval in the instance that a delivery failure notice is received is smaller than the time interval in the instance that a busy Ack is received, and the time interval in the instance that a busy Ack is received is smaller than the time interval in the instance that no Ack is received or a NAck is received.

[1.4] Modifications (1) Use of Received Radio Wave Strength Information of Mobile Stations for Determining Email Arrival Notice Retransmission Times In the embodiment explained above, gateway server 30 evaluates the current status of communication of mobile station 10 on the basis of an Ack, or a delivery failure notice, received through mobile packet communication network 20, and determines the time when it retransmits an email arrival notice according to the communication status of mobile station 10. In addition to the information on the status of communication, information of received radio wave strength of mobile station 10 can be also used for determining the times when email arrival notice is retransmitted and when email is transmitted. In such a case, the following configuration needs to be adopted.

Figure 7:
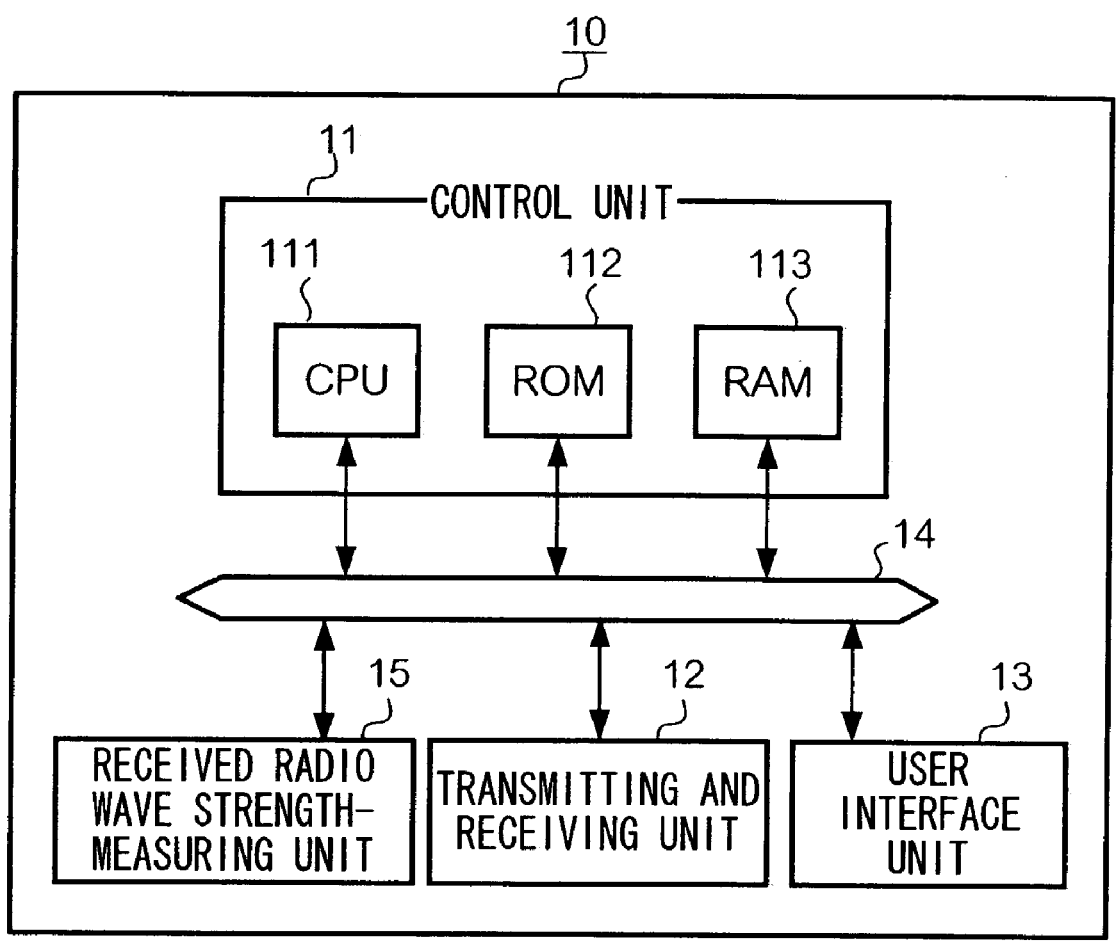
FIG. 7 is a block diagram showing a configuration of a mobile station according to modification (1) of the present invention.

FIG. 7 is a diagram showing a configuration of mobile station 10 in this modification. In FIG. 7, the components, which are the same as those in FIG. 2 are provided with the same symbols as in FIG. 2. As shown in FIG. 7, mobile station 10 in this embodiment comprises received radio wave strength-measuring unit 15 in addition to all the components of mobile station 10 shown in FIG. 2. When transmitting and receiving, unit 12 receives beacon signals transmitted by base station 21, and received radio wave strength-measuring unit 15 measures the strength of the received radio wave of the beacon signals.

In this modification, when CPU 111 of mobile station 10 receives an email arrival notice when mobile station 10 is able to communicate, it transmits an Ack with information regarding the strength of the received radio wave, which is measured by received radio wave strength-measuring unit 15. The information regarding the strength of the received radio wave, which is attached to the Ack, can be expressed in any kind of format. For example, CPU 111 can prepare received radio wave strength indexes, which are classified into 5 stages, namely integral numbers from '1' to '5', according to the measured values of the radio wave strength, and transmit the Ack along with the received radio wave strength indexes. The correspondence between the received radio wave strength indexes and the strength of the received radio wave can be defined freely according to the situation, and it is usually defined on the basis of statistical data or past experiences.

In a system where the information of the strength of the received radio wave is used, for example, email delivery-managing unit 33 of gateway server 30 reads out the information of the strength of the received radio wave, which is attached to a normal Ack, before it transmits the email corresponding to the normal Ack. The email is actually transmitted only when the strength of the received radio wave of mobile station 10 is greater than a predetermined threshold value. According to this system, the transmission of emails can be performed with greater certainty, and a traffic congestion due to an accumulation of data from failed email transmission, can be reduced.

In the above-mentioned modification, mobile station 10 transmits an Ack with information of the strength of the received radio wave, and email delivery-managing unit 33 of gateway server 30 determines whether to retransmit an email arrival notice and transmits an email on the basis of the information attached to the Ack received from mobile station 10. The present invention is not limited to the above described function, and it is also possible that CPU 111 creates information regarding the transition of strength of the received radio wave using the information of the strength of the received radio wave of mobile station 10, which is measured by the received radio wave strength-measuring unit 15, and CPU 111 transmits the Ack with the information regarding the transition. In this case, email delivery-managing unit 31 of gateway server 30 determines whether to retransmit an email arrival notice and transmits an email on the basis of the information regarding the transition of strength of the received radio wave.

In a system where the information regarding the transition of strength of the received radio wave is used, email delivery-managing unit 33 of gateway server 30 reads out the information regarding the transition of strength of the received radio wave attached to NAck when it receives a Nack; and evaluates the present status of mobile station 10, as being under the status of 'decrease of radio wave strength caused by roaming', on the basis of the information, and determines the retrial time for the transmission of email arrival notice. According to this system, the deterioration of the speed of email delivery can be controlled, and also the increase of data traffic caused by failed email arrival notice transmissions can be reduced when mobile station 10 is not able to communicate.

(2) Arrangement of Components of Email Sever System

In the embodiment explained above, the components of a system of the present invention, such as the means for receiving emails, the means for obtaining communication status of mobile stations, the means for determining transmissions of emails, and the means for instructing retrials of obtaining the communication status of mobile stations, are all installed in gateway server 30. However, all or some of these components can also be installed in several separated cabinets instead of being installed together in the gateway server. In such a system, the component groups, which are components grouped by the cabinets, can be connected with each other by information communication network so as to enable them to work together.

The invention claimed is:

1. A method for ensuring delivery of an electronic message to a wireless mobile telephone that has at least an electronic message communication functionality and a voice communication functionality, comprising the steps of:
   (a) determining a reception status of the wireless mobile telephone before sending the electronic message to the wireless mobile telephone;
   (b) it is determined that the wireless mobile telephone is not reachable, executing step (a) at first time intervals that generally progressively widen as a number of consecutive negative determinations that the wireless mobile telephone is not reachable increases;
   (c) if it is determined that the wireless mobile telephone is not receptive to a message delivery, executing step (a) at second time intervals; and
   (d) if determined otherwise in steps (b) and (c), sending the electronic message to the wireless mobile telephone.

2. A method according to claim 1, wherein if a delivery of the electronic message to the telephone fails, executing step (a) at third time intervals.

3. A method according to claim 2, wherein the following relationship generally exists among the first, second and third time intervals:
   the third time interval $\leq$ the second time intervals $\leq$ the first time interval.

4. A method according to claim 1, wherein determining a reception status comprises sending out a message arrival notice.

5. A method according to claim 4, wherein it is determined that the telephone is not reachable if no response is returned within a period of time after the message arrival notice is sent out.

6. A method according to claim 1, wherein it is determined that the telephone is not reachable when it is located outside a service area.

7. A method according to claim 1, wherein it is determined that the telephone is not receptive when it is busy in communication.

8. A method according to claim 1, wherein the first time interval becomes constant after the number of the consecutive negative determinations reaches a predetermined number.

9. A method according to claim 1, wherein determining whether or not the telephone is receptive comprises referring to strength of radio signals being received by the telephone.

10. A method according to claim 1, wherein determining whether or not the telephone is receptive comprises referring to a transition history of strength of radio signals received by the telephone.

11. A method according to claim 1, wherein the telephone is reachable and receptive when determined otherwise in steps (b) and (c).

12. A message delivery device that ensures delivery of an electronic message to a wireless mobile telephone that has at least an electronic message communication functionality and a voice communication functionality, comprising:
   a status inquirer that determines a reception status of the wireless mobile telephone before sending the electronic message to the wireless mobile telephone, wherein the determined reception status is any one of: (a) the wireless mobile telephone is not reachable; (b) the wireless mobile telephone is not receptive to a message delivery; and (c) the wireless mobile telephone is neither in status (a) nor (b);
   a counter that counts a number of consecutive negative determinations by the status inquirer that the wireless mobile telephone is not reachable;
   a transmitter that sends the electronic message to the wireless mobile telephone if the status inquirer determines that the wireless mobile telephone is in status (c); and
   a status inquirer control that if the status inquirer determines that the wireless mobile telephone is in status (a), activates the status inquirer to determine the reception status of the wireless mobile telephone at first time intervals that generally progressively widen as a count by the counter increases, and if the status inquirer determines that the wireless mobile telephone is in status (b), activates the status inquirer at second time intervals.

13. A device according to claim 12, wherein if delivery of the electronic message to the telephone fails, the status inquirer activates the status inquirer to determine the reception status of the telephone at third time intervals.

14. A device according to claim 13, wherein the following relationship generally exists among the first, second and third time intervals:
   the third time interval $\leq$ the second time intervals $\leq$ the first time interval.

15. A device according to claim 12, wherein the status inquirer sends out a message arrival notice.

16. A device according to claim 15, wherein the status inquirer determines that the telephone is in status (a) if no response is returned within a period of time after it sends out the message arrival notice.

17. A device according to claim 12, wherein the status inquirer determines that the telephone is in status (a) when it is located outside a service area.

18. A device according to claim 12, wherein the status inquirer determines that the telephone is in status (b) when it is busy in communication.

19. A device according to claim 12, wherein the first time interval becomes constant after the count by the counter reaches a predetermined number.

20. A device according to claim 12, wherein the status inquirer determines whether or not the telephone is in status (b), based at least on strength of radio signals being received by the telephone.

21. A device according to claim 12, wherein the status inquirer determines whether or not the telephone is in status (b), based at least on a transition history of strength of radio signals received by the telephone.

22. A device according to claim 12, wherein the telephone is reachable and receptive when it is in status (c).

* * * * *